Aug. 9, 1932.   H. J. KÜCHENMEISTER   1,870,313
SELENIUM CELL
Filed July 6, 1928
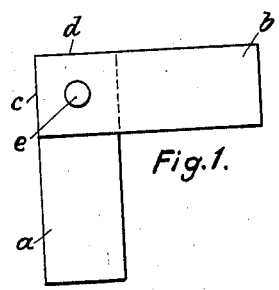
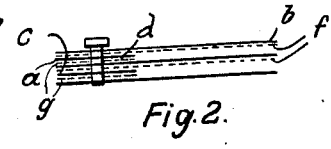
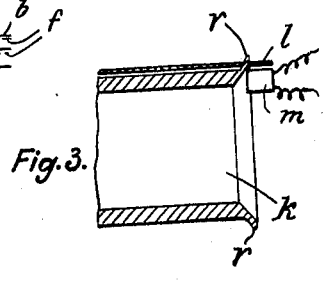
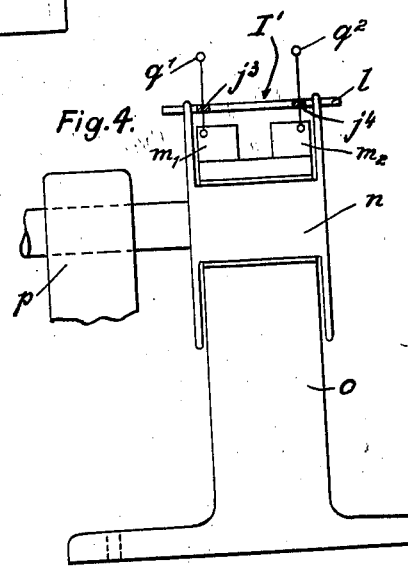
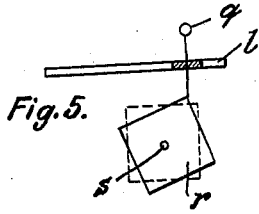
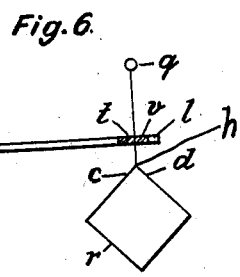
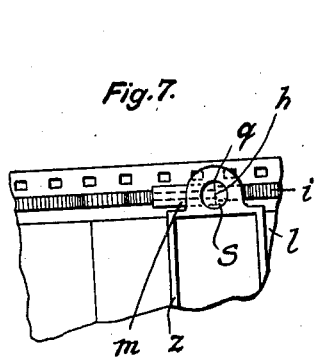
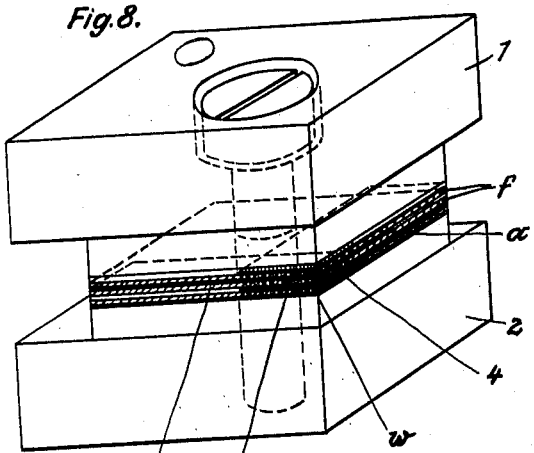
Inventor
Heinrich Johannes Küchenmeister
By John O. Brady.
Attorney Patented Aug. 9, 1932

1,870,313

UNITED STATES PATENT OFFICE

HEINRICH JOHANNES KÜCHENMEISTER, OF BERLIN, GERMANY

SELENIUM CELL

Application filed July 6, 1928, Serial No. 290,781, and in Germany July 16, 1927.

The present invention relates to photoelectric cells and their arrangement, especially in the reproduction of talking films.

The heretofore known photoelectric cells which, for example are enclosed, as alkali metal cells, in glass bodies, or as selenium cells, as condenser cells, etc., carry the photosensitive layer substantially in the center thereof, and experience has shown that they cannot be brought into the immediate vicinity of the controlling phonogram.

According to my invention, for example in the production of selenium cells of the condenser type, the pieces of metal foil are superimposed transversely or at any other convenient relative angle and interleaved with sheets of insulating material, so as to provide a condenser edge on which the photoelectric layer (for example the selenium) is applied in a suitable manner. The light sensitive material is deposited on two contiguous faces of the stack containing the edges of the sheets of metal foil and insulating material, and up to the common edge of these sheets. The advantage of this new arrangement, apart from the possibility of keeping the cell down to very small dimensions, consists in that a tone photograph, recorded for example on a film, can be gone over with the edge of the cell, in extremely close juxtaposition—for example a fraction of the usual distance. The electrical behavior of such cells is also exceedingly favorable, since the dimensions of the condenser surface can be calculated with the greatest ease from the accurately ascertainable overlappings of the conductive foils. Moreover, it is possible by combining, for example three groups of foil in a cell, to provide three independent impression edges. Such cells, rotatably or fixedly mounted in a bearing, assure a precision of adjustment which could not hitherto be obtained with the known means, and consequently a considerable improvement in the quality of the tone reproduction is attained. The inevitable, even though slight, dispersion of the depicted light gap, in the case of any lens, can have its effects greatly minimized by making the angle of the sensitive edge as acute as possible. The aforesaid possibility of making the cells of this novel form and construction very small, also affords the advantage of disposing one or more of these cells according to the invention inside a guide roller for the tone film, between the axis of same and the overlying film, or arranging the cells in an equivalent manner such as is below described, in the picture opening itself when the phonogram is illuminated by transmitted light. This affords a simple and practicable possibility of providing tone records between the perforations of the picture film, without substantially affecting the size of the picture, and to impress the photo cells in a perfect manner as regards tone.

It is within the scope of the invention to provide several surfaces, abutting to form an edge, in such cells with a photoelectric layer, and to impress simultaneously two or more phonograms (which may differ from one another) on both sides of the edge. If, for example, phase-displaced phonograms of a piece of music come into action on the cell from two sides, this diminishes the specific electric action required per square inch of the photoelectric material, and thus improves the tone reproduction, the time lag of the photoelectric material, which exists to a certain extent, entering into this process. According to the invention, it is allowable to impress light upon the cell unit at several points, and the light and shade impulses to act in common, for example through the same amplifier, or through other separate connections.

Typical embodiments of the invention are illustrated, in perspective in the accompanying drawing in which:

Figure 1 is a plan view showing the manner of assembling the condenser sheets employed in the selenium cell of my invention; Fig. 2 is an end view of the cell illustrated in Fig. 1; Fig. 3 shows the relation between the selenium cell of my invention and a film moving mechanism; Fig. 4 illustrates a modified arrangement of film moving mechanism with respect to a plurality of selenium cells arranged according to my invention; Fig. 5 is a theoretical view illustrating the manner in which the angular position of the selenium cell may be changed with respect to the sound record on the film; Fig. 6 illustrates the position of a selenium cell with respect to a sound record on a film where the apex of the condenser plates is directly presented to the action of light rays passing through the sound record on a film; Fig. 7 is a plan view illustrating the arrangement of light sensitive cells with respect to the sound record on a motion picture film arranged in accordance with my invention; and Fig. 8 is a perspective view of the selenium cell of my invention.

Referring to the drawing in detail, Fig. 1 shows how the several condenser sheets $a$ and $b$ are superimposed, the sheet $a$ crossing the sheets $b$, for example at right angles. The edges $c$ and $d$ being accurately trimmed, it is always possible to keep the capacity area formed by the overlapping of $a$ and $b$ in the manufacture of these cells exact. The several condenser sheets can be secured together by screws passing through an aperture $e$. The dotted line representing a continuation of the edge of sheet $a$ indicates the possibility of forming an additional cell edge.

Fig. 2 is a cross section through the cell, $a$ and $b$ are the condenser sheets, which are spaced and insulated from each other, by mica insulating plates $f$ and $g$. The edges $c$ or $d$ are provided with a photosensitive layer.

Fig. 3 represents a guide roller $k$ for tone films, on which the tone film $l$ is guided over pins $r$. As can be seen from the figure, the cell $m$ can be disposed in close proximity to the phonogram. This is because—contrary to the usual design—the tone drums are perforated immediately behind the guide pins $r$, so that the projecting portion of the edge of the film can be illuminated by transmitted light. This affords the possibility of reading off the phonograms, recorded on the outer edge of the film, by means of the cell of my invention without loss of room or space.

Fig. 4 represents a tone film guide roller $n$, which is mounted on a standard $o$, and its axis passes through a bearing $p$. In the interior of the guide roller $n$, that is, in a groove which extends substantially over the entire surface between the perforations, are disposed two cells $m^1$ and $m^2$. A tone film $l$ is provided, inside the perforations, with two tone records $j^3$ and $j^4$ extending parallel between the perforations. The light rays from two sources of light $q^1$ and $q^2$ are able to act independently on the cell through the film.

Fig. 5 represents the edge of a cell, which is exposed to the action of a source of light $q$ through a film $l$. The position indicated by dotted lines denotes that the cell can be turned on its axis $s$, by which means the area of the sensitive layer exposed to the light rays can be diminished as required and, on occasion, reduced to a thin line.

Fig. 6 is a section of a photoelectric cell, in which the photoelectric layer is applied to the edges $c$ and $d$ on both sides of the edge $h$. With this arrangement it is possible, for example, either to impress variations in light solely on the edge $h$ making, as it were, a cell formed of only one sharp line, or, by means of several phonograms $t$, $v$, and corresponding optical devices, to impress variable light upon the layers $c$ and $d$ simultaneously, but differently.

Fig. 7 shows, as a further example, the arrangement of a cell when the phonogram is reproduced in the picture opening. This opening is provided with an aperture $s$, through which the phonogram $j$—arranged, for example, between the perforations—is illuminated in order to impress variable light upon the cell $m$, which, in this arrangement, is disposed in such a manner that the selenium edge $h$ lies as a line parallel to the markings on the phonogram.

Fig. 8 is a perspective view of the selenium cell of my invention.

I claim:—

1. A photoelectric cell comprising a stack of a multiplicity of alternate layers of conducting material and insulating material of polygonal shape, alternate conducting layers being conductively connected together, said stack having two contiguous faces extending normal to each other and coated with light sensitive material up to their common edge, and means for angularly adjusting the position of said cell for laterally shifting the junction of the edges of said stack and rendering either edge thereof effective to the action of variable light rays.

2. In a photoelectric cell, a multiplicity of alternately arranged conductive and dielectric sheets, the alternate conductive sheets being conductively connected together, said conductive sheets terminating in edge portions extending normal to each other and which are angularly adjustable with respect to a path of light rays, the edges of said conductive sheets being coated with light sensitive material, the juncture of said edges of said conductive sheets being shiftable to selected angular positions with respect to a beam of variable light rays.

3. In a photoelectric cell, a stack of a multiplicity of alternately arranged conductive and dielectric sheets, said stack having two contiguous faces disposed substantially at right angles to each other, a light sensitive coating on said two contiguous faces up to their juncture, and means for mounting said stack for angular movement for shifting the juncture of said faces to selected angular positions with respect to a path of light rays.

4. A photoelectric cell comprising a pair of pressure plate members, a plurality of rectangular strips of conductive and dielectric material alternately disposed in superimposed position between said pressure plate members, the edges of said strips being aligned normal with respect to each other adjacent one corner of said pressure plate members, light sensitive material carried by the adjacent edges of said strips and pivot means extending through said pressure plate members clear of said strip for angularly shifting the juncture of said edges laterally with respect to rays of light focused thereon.

In testimony whereof I affix my signature.

HEINRICH JOHANNES KÜCHENMEISTER.